(12) United States Patent
Gan et al.

(10) Patent No.: US 7,784,747 B2
(45) Date of Patent: Aug. 31, 2010

(54) SLIDABLY ADJUSTABLE STAND

(75) Inventors: Wen-Lin Gan, Shenzhen (CN); Fan Zhou, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 171 days.

(21) Appl. No.: 12/135,997

(22) Filed: Jun. 9, 2008

(65) Prior Publication Data

US 2009/0146037 A1      Jun. 11, 2009

(30) Foreign Application Priority Data

Dec. 7, 2007     (CN) .......................... 200710202927

(51) Int. Cl.
*A47J 47/16*   (2006.01)
(52) U.S. Cl. .................... 248/132; 248/123.11; 248/917
(58) Field of Classification Search ................. 248/132, 248/161, 157, 917, 919, 423, 123.11, 125.1; 361/679.01, 679.02
See application file for complete search history.

(56) References Cited

U.S. PATENT DOCUMENTS

| 6,712,321 | B1* | 3/2004 | Su et al. ................. 248/123.11 |
| 7,631,841 | B1* | 12/2009 | Yen et al. ..................... 248/121 |
| 2004/0113131 | A1* | 6/2004 | Hamada et al. ............. 252/582 |
| 2007/0045488 | A1* | 3/2007 | Shin ......................... 248/176.1 |
| 2007/0262224 | A1* | 11/2007 | Cheng ......................... 248/423 |
| 2007/0278364 | A1* | 12/2007 | Jang ........................... 248/161 |
| 2008/0006744 | A1* | 1/2008 | Sun ............................. 248/161 |

\* cited by examiner

*Primary Examiner*—Ramon O Ramirez
(74) *Attorney, Agent, or Firm*—Zhigang Ma

(57) ABSTRACT

An exemplary stand includes a housing (51), a sliding member (52), four connecting subassemblies (58, 59), and a spring (56). The housing (51) has two opposite guiding slots (516). The sliding member is slidably disposed in the housing. Part of each connecting subassembly extends in one corresponding guiding slot of the housing and the sliding member, such as to slidably connect the sliding member to the housing. Each connecting subassembly includes two wheels (584) rotatably received in the guiding slots. One end of the spring is connected to the housing, and the other end of the spring is sleeved on the sliding member or the connecting subassemblies.

20 Claims, 5 Drawing Sheets

US 7,784,747 B2

SLIDABLY ADJUSTABLE STAND

BACKGROUND OF THE INVENTION

1. Field of the Invention

The present invention relates generally to stands for display devices, more particularly to a height-adjustable stand for supporting a display device.

2. Discussion of the Related Art

Liquid crystal display (LCD) devices are gradually replacing conventional cathode ray tube (CRT) devices because LCD devices have excellent display quality and are thinner and lighter than CRT devices. Due to their different structures and weights, stands designed for supporting conventional CRT devices are not suitable for LCD devices. Stands used for supporting LCD devices, including height-adjustable stands, have different requirements and specifications.

Referring to FIG. 5, a typical stand 100 for an LCD device includes a first stand unit 10, a second stand unit 20, a spring 30, a shaft 31, and four fastening members 33. The first stand unit 10 includes a base plate 11 and two side plates 12 perpendicularly extended from opposite sides of the base plate 11. A flange 13 is formed around an end of each side plate 12, with the two flanges 13 being opposite to the base plate 11. The base plate 11, the side plates 12, and the flanges 13 cooperatively define a receiving groove 14. Two guide rails 15 are formed at the inner surfaces of the two side plates 12 respectively. Each of the flanges 13 defines a fixing hole 131 adjacent to an end thereof. The second stand unit 20 is movably sleeved into the first stand unit 10. The second stand unit 20 has a connecting portion 21 on a top side thereof, for connecting to an LCD panel of the LCD device. The connecting portion 21 defines two positioning holes 22 at a bottom side thereof. The shaft 31 defines two through holes 311 in opposite ends thereof. An end of the spring 30 is sleeved on the shaft 31, and the other end of the spring 30 defines two through holes 32.

In assembly of the stand 100, the second stand unit 20 is inserted into the first stand unit 10. Each fastening member 33 extends through one corresponding through hole 311 of the shaft 31 and one corresponding fixing hole 131 of the flanges 13, thus fixing the shaft 31 to the first stand unit 10. Each fastening member 33 extends through one corresponding through hole 32 of the spring 30 and one corresponding positioning hole 22 of the second stand unit 20, thus fixing the spring 30 to the second stand unit 10. In use, the second stand unit 20 can be driven to slide in the first stand unit 10 by an external force. When the external force is removed, the LCD panel connected to the second stand unit 20 can be positioned at a desired position, because a sum weight of the LCD panel and the second stand unit 20 is equal to a sum force of an elastic force produced by the spring 30 and a friction force between the second stand unit 20 and the first stand unit 10. That is, the LCD panel can keep balance at the desired position.

However, a friction force between the second stand unit 20 and the first stand unit 10 is great because the contacting area therebetween is large. Thus a correspondingly large external force needs to be exerted in order to overcome the friction force and drive the second stand unit 20 to a desired position.

Therefore, a stand for a display device to solve the aforementioned problems is desired.

SUMMARY

An exemplary stand includes a housing, a sliding member, four connecting subassemblies, and a spring. The housing has two opposite guiding slots. The sliding member is slidably disposed in the housing. Part of each connecting subassembly extends in one corresponding guiding slot of the housing and the sliding member, to slidably connect the sliding member to the housing. Each connecting subassembly includes two wheels rotatably and slidably received in the guiding slot. One end of the spring is connected to the housing, and the other end of the spring is sleeved on the sliding member or the connecting subassemblies.

Other advantages and novel features will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of the present stand for a display device. Moreover, in the drawings, like reference numerals designate corresponding parts throughout the several views.

DETAILED DESCRIPTION OF THE EMBODIMENTS

Figure 1:
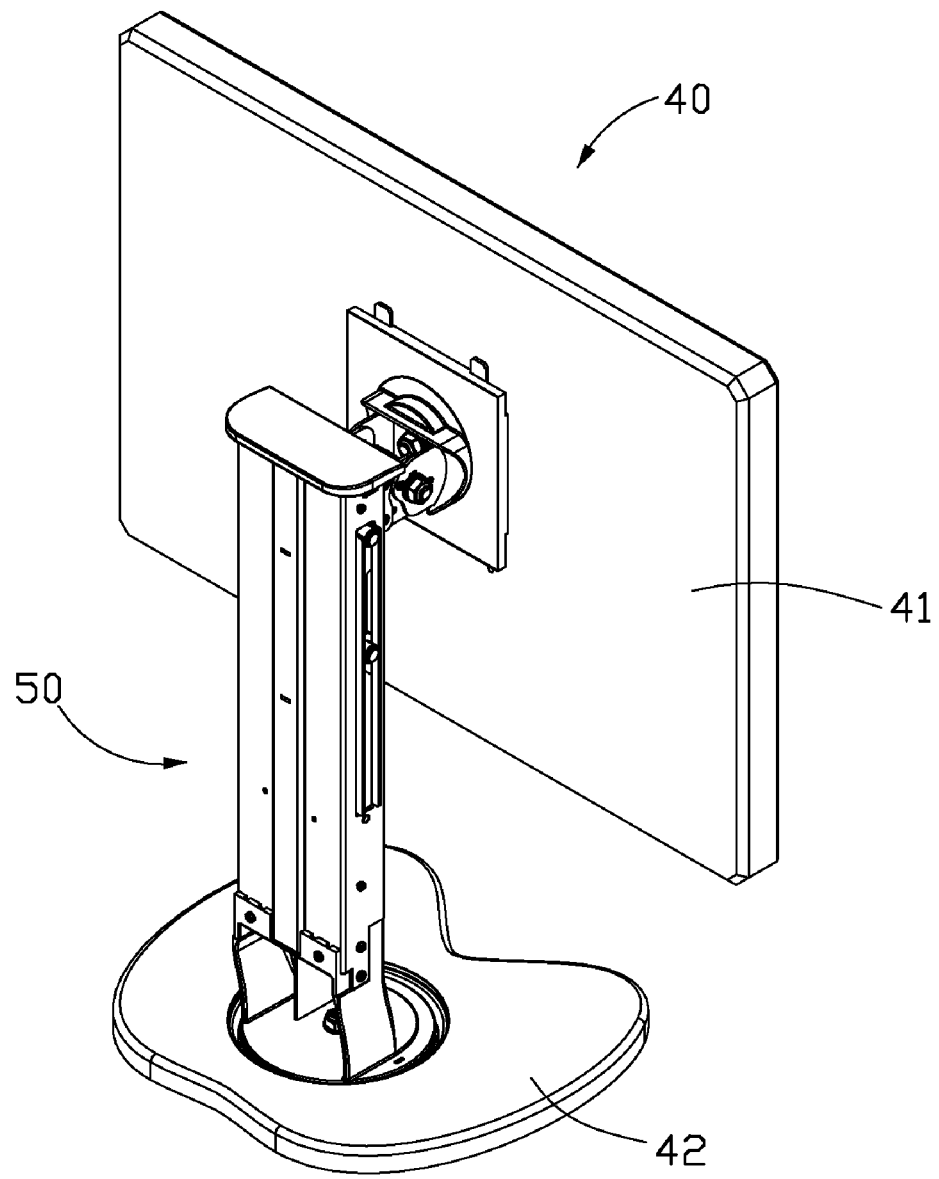
FIG. 1 is an isometric view of an LCD device using a stand in accordance with an exemplary embodiment of the present application.

A stand according to an exemplary embodiment of the present invention is adapted for use in a display device such as an LCD device. Referring to FIG. 1, the LCD device 40 includes an LCD panel 41, a base 42, and a stand 50 for connecting the LCD panel 41 to the base 42.

Figure 2:
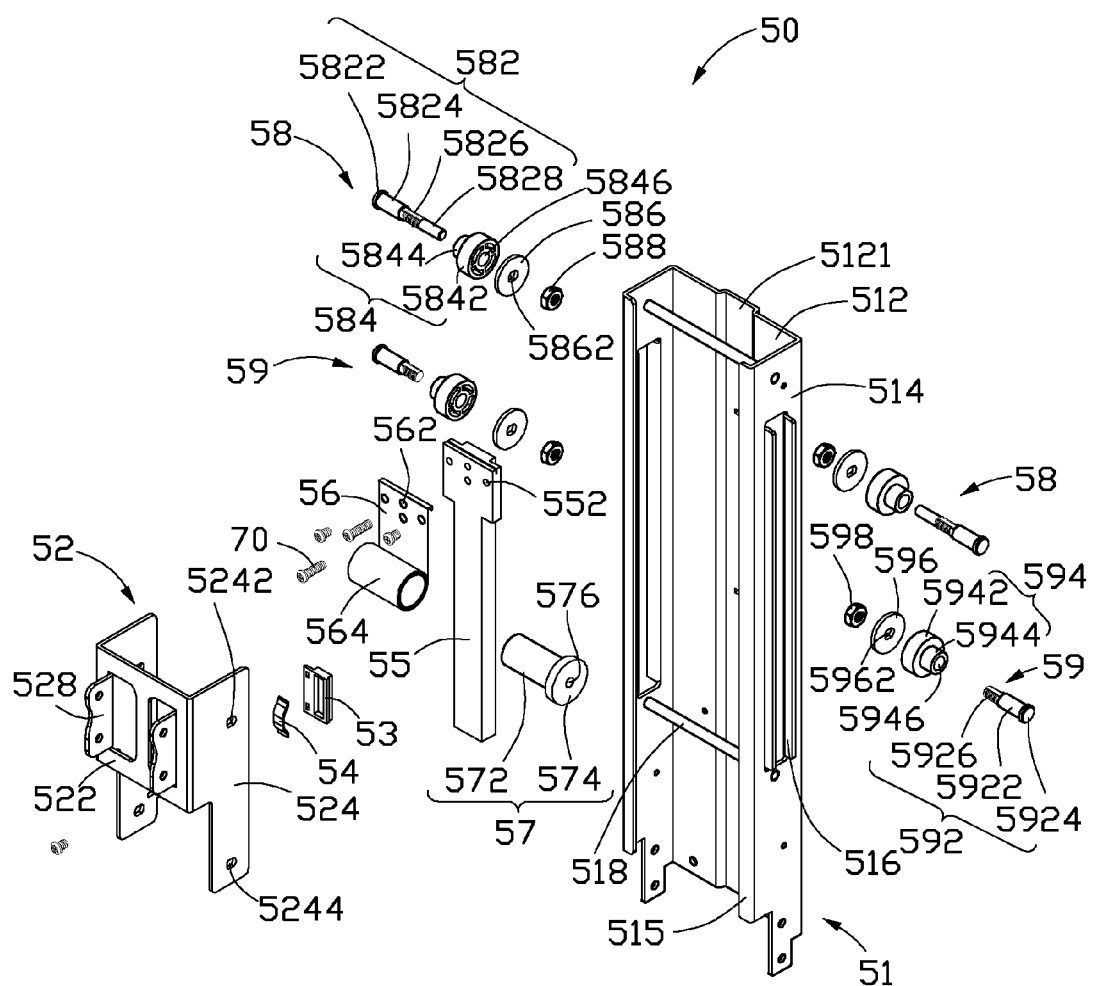
FIG. 2 is an exploded, isometric view of the stand of FIG. 1.
Figure 3:
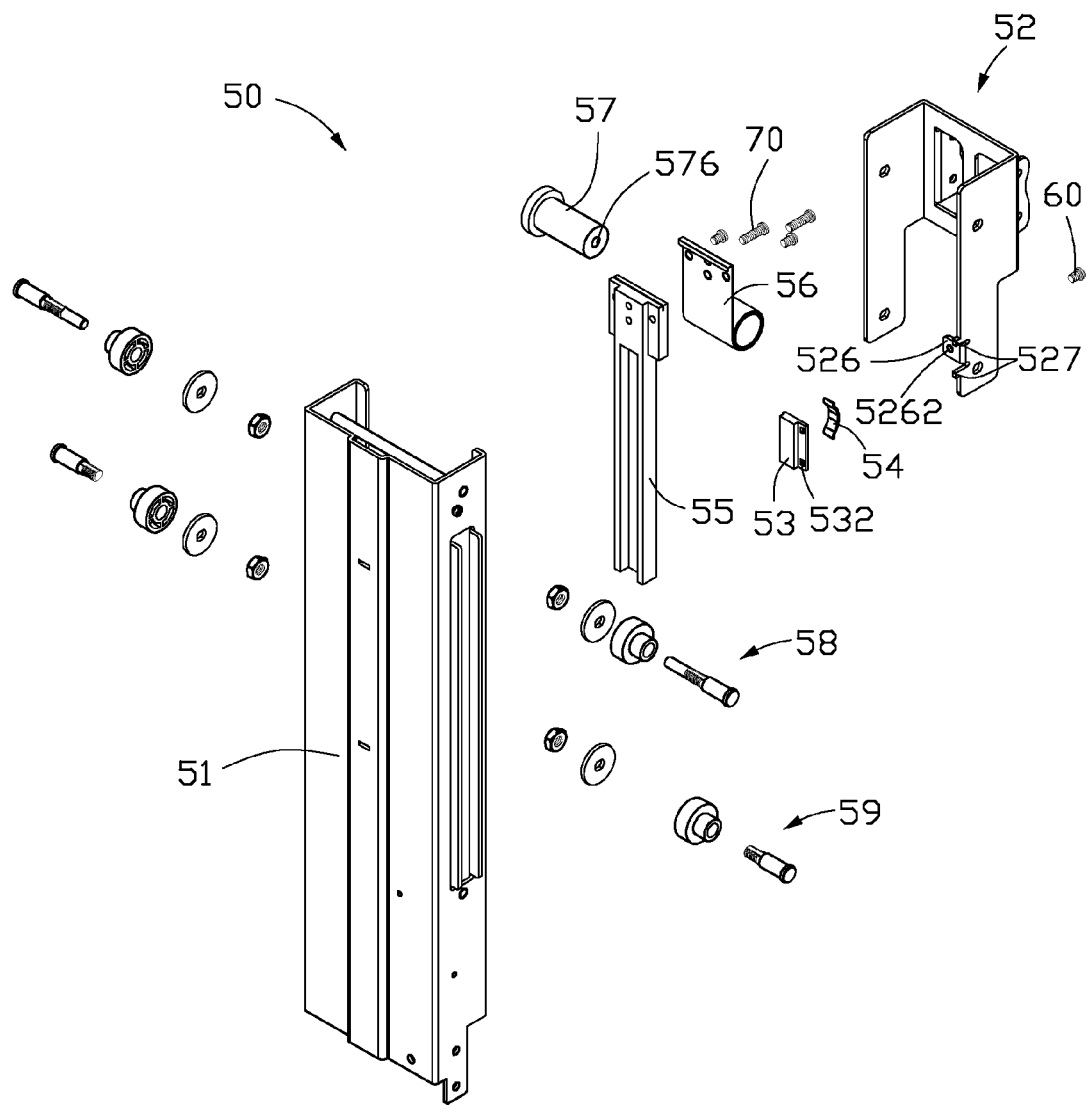
FIG. 3 is an exploded, isometric view of the stand of FIG. 1, viewed from another aspect.
Figure 4:
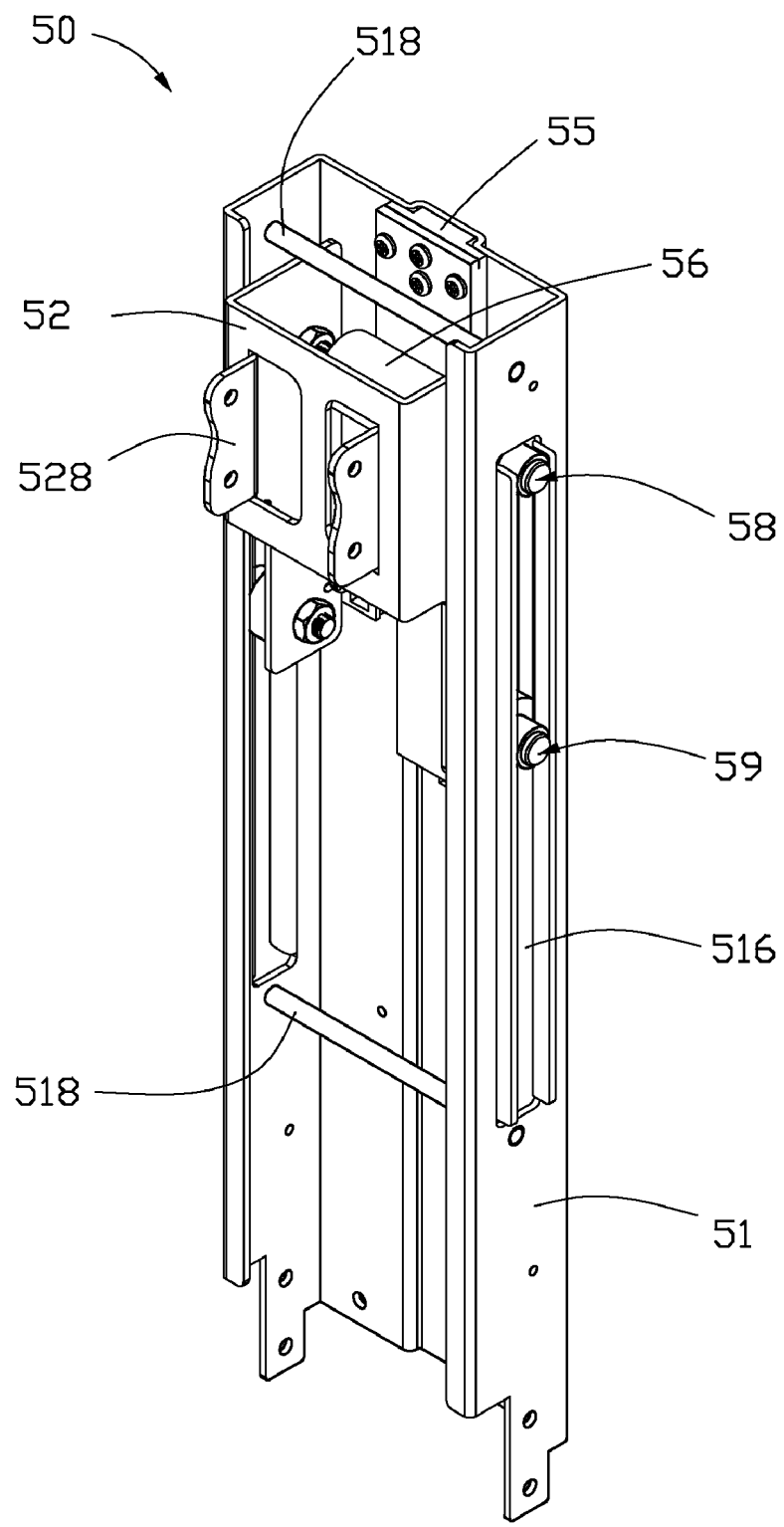
FIG. 4 is an assembled view of the stand of FIG. 2.
Figure 5:
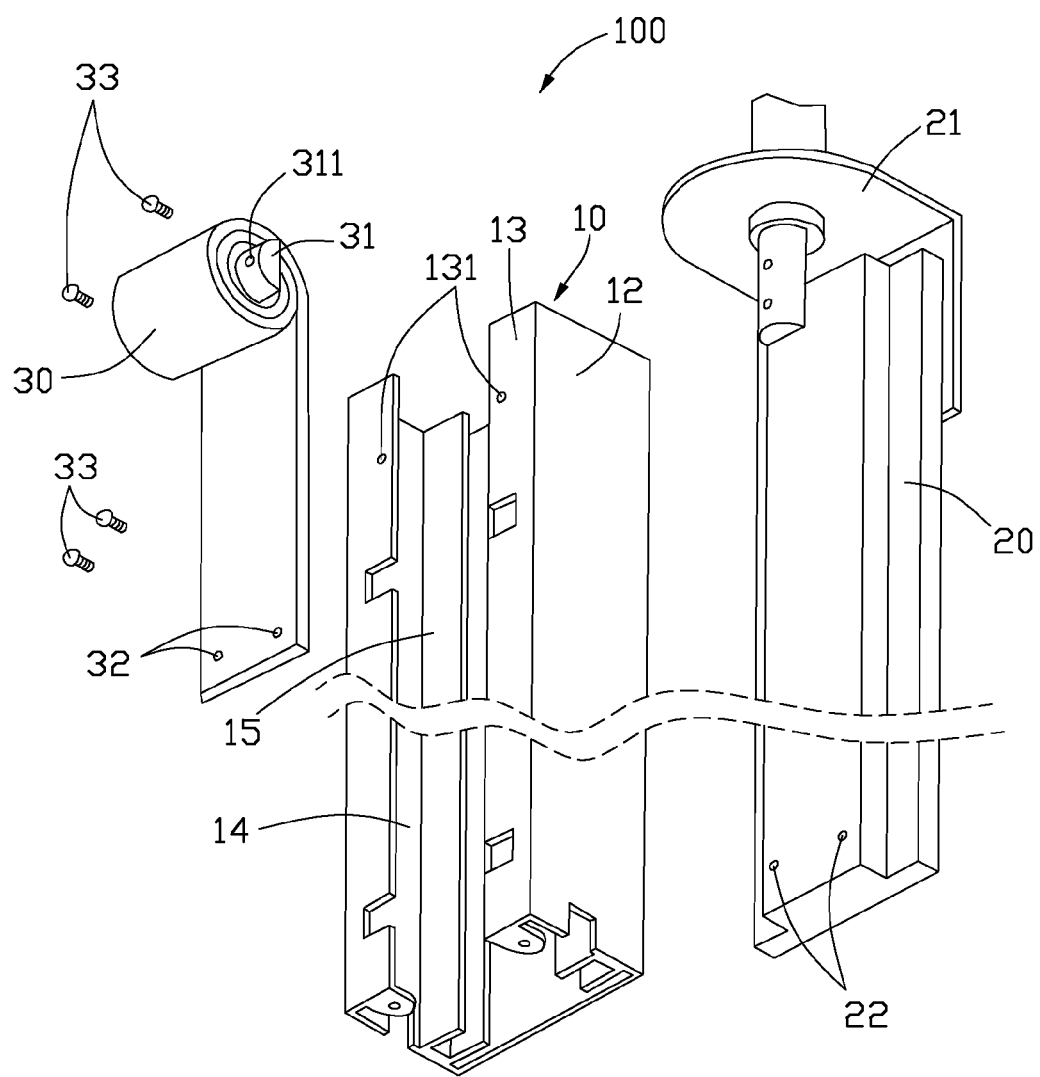
FIG. 5 is an abbreviated, exploded, isometric view of a conventional stand.

Referring also to FIGS. 2 through 4, the stand 50 include a housing 51, a sliding member 52, a friction member 53, an elastic piece 54, a connecting member 55, a spring 56, a rotating shaft 57, two first connecting subassemblies 58, and two second connecting subassemblies 59.

The housing 51 includes a base plate 512 and two side plates 514 perpendicularly extended from opposite sides of the base plate 512. A flange 515 is formed around an end of each side plate 514, the two flanges 515 being opposite to the base plate 512. The base plate 512 defines a groove 5121 in the middle thereof. Each of the side plates 514 defines a guiding slot 516. Two bars 518 for connecting one side plate 514 to the other side plate 514 are disposed on opposite ends of the housing 51 respectively.

The sliding member 52 includes a flat plate 522 and two connecting pieces 524 perpendicularly extended from opposite sides of the flat plate 522. The length of the connecting piece 524 is greater than that of the flat plate 522. Each of the connecting pieces 524 defines a first fixation hole 5242 for letting the first connecting subassembly 58 pass through, and a second fixation hole 5244 for letting the second connecting subassembly 59 pass through. A positioning piece 526 perpendicularly extends from a side of one connecting piece 524 opposite to the flat plate 522. A through hole 5262 is defined at the center of the positioning piece 526. Two protrusions 527 are formed on the side forming the connecting piece 524, and are disposed at opposite sides of the positioning piece 526. Two fixing pieces 528 are formed in the middle of the flat plate 522, and extend in a direction away from the connecting piece 524. The fixing pieces 528 are connected to the LCD panel 41.

The friction member 53 is made of plastic in this embodiment. The friction member 53 defines two rectangular shaped fixing holes 532, for receiving the protrusions 527 of the sliding member 52. The elastic piece 54 is configured for resisting between the positioning piece 526 and the friction member 53. A resisting member 60 is configured for extending through the through hole 5262 of the positioning piece 526, and resisting the elastic piece 54.

The connecting member 55 defines a plurality of assembling holes 552 at an end thereof, and is configured for being received in the groove 5121 of the base plate 512. One end of the spring 56 defines a plurality of through holes 562 corresponding to the assembling holes 552, and the other end of the spring 56 is coiled to form a cylinder 564.

The rotating shaft 57 includes a cylindrical main body 572 and a flange 574 extending around an end of the main body 572. The main body 572 is configured for inserting into the cylinder 564. The rotating shaft 57 defines a through hole 576 along an axis thereof.

Each first connecting subassembly 58 includes a first pivot shaft 582, a wheel 584, a washer 586, and a nut 588. The first pivot shaft 582 includes a shaft cap 5822, a shaft portion 5824, a threaded portion 5826, and a shaft end 5828. The threaded portion 5826 is configured for engaging with the nut 588. The shaft end 5828 is configured to insert into the through hole 576 of the rotating shaft 57. The wheel 584 includes a cylindrical main body 5842 and a cylindrical inserting portion 5844 extended from a center of the main body 5842. The diameter of the inserting portion 5844 is smaller than that of the main body 5842. The inserting portion 5844 is configured for being rotatably received in the guiding slot 516 of the housing 51. The center of the wheel 584 defines an inserting hole 5846. The first connecting subassembly 58 is configured for extending through the guiding slot 516 of the housing 51 and the first fixation hole 5242 of the sliding member 52, thus connecting the sliding member 52 to the housing 51.

Each second connecting subassembly 59 includes a second pivot shaft 592, a wheel 594, a washer 596, and a nut 598. The second pivot shaft 592 includes a shaft portion 5922. A shaft cap 5924 and a threaded portion 5926 extend from opposite ends of the shaft portion 5922 respectively. The threaded portion 5926 is configured for engaging with the nut 598. The wheel 594 includes a cylindrical main body 5942 and a cylindrical inserting portion 5944 extended from a center of the main body 5942. The diameter of the inserting portion 5944 is smaller than that of the main body 5942. The inserting portion 5944 is configured for being rotatably received in the guiding slot 516 of the housing 51. A center of the wheel 594 defines an inserting hole 5946. The second connecting subassembly 59 is configured for extending through the guiding slot 516 of the housing 51 and the second fixation hole 5244 of the sliding member 52, thus further connecting the sliding member 52 to the housing 51.

Referring particularly to FIGS. 2 through 4, in assembly of the stand 50, the connecting member 55 is engaged into the groove 5121 of the base plate 512, to fixedly connected to the base plate 512. The spring 56 is fixed to the connecting member 55 via a plurality of screws 70. The main body 572 of the rotating shaft 57 is inserted into the cylinder 564 of the spring 56. The wheels 584 are inserted into the corresponding guiding slots 516 of the housing 51 from the inside of the housing 51 correspondingly. The wheels 594 are inserted into the guiding slots 516 of the housing 51 from the inside of the housing 51. The friction member 53 is engaged with the protrusions 527 of the sliding member 52. The elastic piece 54 is disposed between the friction member 53 and the positioning piece 526. The resisting member 60 protrudes through the through hole 5262 of the positioning piece 526, and resists the elastic piece 54. The sliding member 52 is laid between the two side plates 514 of the housing 51, and each connecting pieces 524 contacts the corresponding side plates 514. As such, the friction member 53 resists the base plate 512. The first pivot shaft 582 is inserted through the guiding slot 516 of the side plate 514, the wheel 584, the washer 586, the connecting piece 524, and is engaged with the nut 588. The shaft end 5828 of the first pivot shaft 582 is inserted into the through hole 576 of the rotating shaft 57. The second pivot shaft 592 is inserted through the guiding slot 516 of the side plate 514, the wheel 594, the washer 596, the connecting piece 524, and is engaged with the nut 598. Thereby, the sliding member 52 is slidably connected to the housing 51, and the spring 56 is connected to the sliding member 52 and the housing 51. After the stand 50 is assembled, the LCD panel 41 can be fixed to the sliding member 52 via the two fixing pieces 528 and a plurality of corresponding fastening members (not shown).

Referring to FIGS. 1 through 4, in use, the sliding member 52 can be driven to slide in the housing 51 between the bars 518 by an external force. At the same time, an elastic force is produced by the spring 56 due to an extension of the spring 56. When the external force is removed, the LCD panel 41 connected to the sliding member 52 will remain in a desired position, because a sum weight of the LCD panel 41 and the sliding member 52 is equal to a sum force of the elastic force produced by the spring 30 and a friction force between the friction member 53 and the housing 51. That is, the LCD panel 41 can keep balance at the desired position.

The sliding member 52 may slide in the housing 51 easily, due to the sliding member 52 being connected to the housing 51 by the first and second connecting subassemblies 58 and 59 with the wheels 584 and 594. In addition, the LCD panel 41 is fixed to the sliding member 52, and the sliding member 52 is slidably received in the housing 51 between the bars 518. When the LCD panel 41 is pushed by an unexpected side force, the housing, not the sliding member 52, will withstand the side force. Thus, the sliding member 52 can be thin and light, to reduce the weight and the manufacturing cost of the stand 50. Furthermore, the housing 51 of the stand 50 can be integrally formed by punching.

The friction member 53 is set between the sliding member 52 and the housing 51. When the LCD panel 41 at rest is pushed by an unwanted/unexpected force, a friction force will be produced between the friction member 53 and the LCD panel 41, thus preventing the LCD panel 41 from easily moving. Therefore, the friction member 53 can keep the LCD panel 41 stable at a predetermined position when in use.

It should be understood that the stand 50 may only include one connecting subassembly, such as a connecting subassembly having a longer pivot shaft and two wheels sleeved on the opposite end of the pivot shaft. The stand 50 may have six or more connecting subassemblies, to increase a connecting strength between the sliding member 52 and the housing 51. The stand 50 may include two or more friction members 53 according to a predetermined friction force between the sliding member 52 and the housing 51. The spring 30 may be directly connected to the sliding member 52 in place of the first connecting subassembly 58. Furthermore, the friction member 53 of the stand 50 may be omitted, but a stabilization of the stand 50 decreases.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A stand comprising:
   a housing having two opposite guiding slots;
   a sliding member slidably disposed in the housing;
   at least two connecting subassemblies, at least part of each connecting subassembly extending in one corresponding guiding slot of the housing and the sliding member, such as to slidably connect the sliding member to the housing, and each connecting subassembly having at least one wheel, the at least one wheel rotatably and slidably received in the guiding slot; and a spring, one end of the spring connected to the housing, and the other end of the spring sleeved on the sliding member or the connecting subassemblies, thus providing an elastic force to overcome the total weight of the sliding member and a load mounted thereon.

2. The stand of claim 1, wherein the housing comprises a base plate and two side plates perpendicularly extending from opposite sides of the base plate, and each guiding slot is defined at a corresponding side plate.

3. The stand of claim 2, further comprising a connecting member, wherein the base plate defines a groove in the middle, the connecting member is engaged in the groove, and an end of the spring is fixed to the connecting member.

4. The stand of claim 2, wherein the sliding member comprises a flat plate and two connecting pieces perpendicularly extending from opposite sides of the flat plate.

5. The stand of claim 4, wherein the sliding member further comprises two fixing pieces formed at the middle of the base, and extending in a direction away from the connecting piece, the fixing pieces configured for connecting to a display panel.

6. The stand of claim 4, wherein the at least two subassemblies comprises two first connecting subassemblies, each of the connecting pieces defines a first fixation hole, each first connecting subassembly extends through a corresponding guiding slot of the housing and the first fixation hole of a corresponding connecting piece, such as to slidably connect the sliding member to the housing.

7. The stand of claim 6, wherein each first connecting subassembly comprises a first pivot shaft and a nut, the first pivot shaft comprises a shaft cap, a shaft portion, a threaded portion, and a shaft end, a center of a corresponding at least one wheel defines an inserting hole, and the first pivot shaft extends through the guiding slot of the housing, the inserting hole of the at least one wheel and the first fixation hole of the connecting piece and is engaged with the nut.

8. The stand of claim 7, wherein an end of the spring is connected to the housing, and the other end of the spring is sleeved around the shaft end.

9. The stand of claim 8, further comprising a rotating shaft, wherein the rotating shaft defines a through hole along an axis thereof, the shaft end is received in the through hole of the rotating shaft, and the end of the spring is sleeved on the rotating shaft.

10. The stand of claim 6, wherein the at least one subassembly further comprises two second connecting subassemblies, each of the connecting pieces defines a second fixation hole, each second connecting subassembly extends through a corresponding guiding slot of the housing and the second fixation hole of a corresponding connecting piece, such as to further slidably connect the sliding member to the housing.

11. The stand of claim 10, wherein each second connecting subassembly comprises a second pivot shaft and a nut, the second pivot shaft comprises a shaft cap, a shaft portion, a threaded portion, a center of a corresponding at least one wheel defines an inserting hole, the second pivot shaft extends through the guiding slot of the housing, the inserting hole of the corresponding at least one wheel, and the second fixation hole of the connecting piece, and is engaged with the nut.

12. The stand of claim 1, further comprising a friction member, wherein the friction member is fixed to the sliding member and contacts the housing, thus producing a friction force between the housing and the sliding member.

13. The stand of claim 12, further comprising an elastic member, wherein the elastic member is held between the friction member and the sliding member.

14. The stand of claim 1, wherein the at least one wheel comprises a main body and an inserting portion extended from a center of the main body, and the inserting portion is received in a corresponding guiding slot of the housing.

15. The stand of claim 1, wherein the housing further comprises two bars disposed on opposite ends thereof, the bars limiting a sliding range of the sliding member.

16. A stand comprising:
a first stand unit having at least one guiding slot;
a second stand unit slidably disposed to the first stand unit;
at least one connecting subassembly having at least one wheel, the at least one connecting subassembly configured for slidably connecting the sliding member to the first stand unit, and the at least one wheel rotatably and slidably received in the at least one guiding slot; and
a resilient member configured for connecting the first stand unit to the second stand unit, thus producing a resilient force to prevent the second stand unit from moving relative to the first stand unit.

17. The stand of claim 16, further comprising a friction member, wherein the friction member is fixed to the second stand unit, and contacts the first unit, thus producing a friction force between the second stand unit and the first stand unit.

18. The stand of claim 17, further comprising an elastic member, wherein the elastic member is held between the friction member and the second stand unit.

19. The stand of claim 16, wherein at least one wheel comprises a main body and an inserting portion extended from a center of the main body, and the inserting portion is received in a corresponding guiding slot of the first stand unit.

20. The stand of claim 16, wherein the first stand unit further comprises two bars thereof, the bars limiting a sliding range of the second stand unit.

* * * * *